United States Patent [19]

Inui

[11] Patent Number: 5,477,480
[45] Date of Patent: Dec. 19, 1995

[54] CARRY LOOK AHEAD ADDITION METHOD AND CARRY LOOK AHEAD ADDITION DEVICE

[75] Inventor: Shigeto Inui, Tokyo, Japan

[73] Assignee: NEC Corporation, Tokyo, Japan

[21] Appl. No.: 89,688

[22] Filed: Jul. 9, 1993

[30] Foreign Application Priority Data

Jul. 10, 1992 [JP] Japan .................................. 4-183282

[51] Int. Cl.$^6$ ....................................... G06F 7/50
[52] U.S. Cl. ....................................... 364/787
[58] Field of Search ..................... 364/787, 786

[56] References Cited

U.S. PATENT DOCUMENTS 5,166,899  11/1992  Lamb .................................. 364/787
5,276,635  1/1994  Naini et al. ........................ 364/787

*Primary Examiner*—Tan V. Mai

*Attorney, Agent, or Firm*—Whitham, Curtis, Whitham & McGinn

[57] ABSTRACT

A carry look ahead addition device includes a carry generation/propagation term generator which receives input of two numbers each having a length of n (positive integer) bits and generates the carry generation term and the carry propagation term for each bit, a carry generator which generates a carry for each bit based on the carry input and the carry generation term and the carry propagation term from the carry generation/propagation term generator, and a sum generator. The carry generator receives the carry input and, at the same time, the carry generation term and the carry propagation term are generated at the carry generation/propagation term generator. The carry generator deems the carry input as the carry generation term at the bit immediately below the least significant bit (Bit −1) and the carry propagation term at the Bit −1 to be 0 for processing without a carry input for n+1 bits so as to generate a carry having a length of n+1 bits.

6 Claims, 6 Drawing Sheets

CARRY LOOK AHEAD ADDITION METHOD AND CARRY LOOK AHEAD ADDITION DEVICE

BACKGROUND OF THE INVENTION

1. Field of the Invention

The present invention relates to a carry look ahead addition method and a device therefor and particularly relates to a carry look ahead addition method and a device therefor used in addition and subtraction by a digital computer.

2. Description of the Prior Art

Conventionally, addition and subtraction of two numbers are mainly processed by a carry look ahead type addition method. Suppose here that the two numbers to be added are A and B and their bit length is n (positive integer). The bit values for A are $a(n-1), a(n-2), \ldots, a1, a0$ and the bit values for B are $b(n-1), b(n-2), \ldots, b1, b0$.

The carry generation term $g(n-1), g(n-2), \ldots, g1$ or $g0$ and the carry propagation term $p(n-1), p(n-2), p1$ or $p0$ are given by the following expressions (1) and (2):

$$pi = ai \; (+) \; bi \tag{1}$$

$$gi = ai \bullet bi \tag{2}$$

where (+) indicates exclusive-OR. Next, the sum and the carry are supposed to be $s(n-1), s(n-2), \ldots, s1$ or $s0$ and $c(n-1), c(n-2), \ldots, c1, c0$ respectively. They can be represented by the expressions (3) and (4) below using gi and pi:

$$ci = pi + pi \bullet c(i-1) \tag{3}$$

$$si = pi \; (+) \; c(i-1) \tag{4}$$

By determining the carries for all bits at a time using the expressions (3) and (4), the sum can be also determined at a time for all bits. An actual addition device usually comprises three sections: a generator for carry generation term and carry propagation term to execute the expressions (1) and (2) (a pg generator), a carry generator to execute the expression (3) and a sum generator to execute the expression (4).

Next, two conventional addition methods actually used will be described below. There are BLC (Binary Look-ahead Carry) addition method and BCLA (Block Carry Look Ahead) addition method.

Firstly, BLC method is described. By applying the expression (3) to the bits with supposing the carry input to be cin, the following expression (5) can be obtained:

$$
\begin{aligned}
c0 &= g0 + p0 \times cin \\
c1 &= g1 + p1 \times c0 \\
&= g1 + p1 \times g0 + p1 \times p0 \times cin \\
&\cdot \\
&\cdot \\
&\cdot \\
ci &= gi + pi \times c(i-1) \\
&= gi + pi \times g(i-1) + pi \times p(i-1) \times c(i-2) \\
&= \ldots \\
&= gi + pi \times g(i-1) + pi \times p(i-1) \times c(i-2) \\
&+ \ldots \\
&+ pi \times p(i-1) \times p(i-2) \ldots p1 \times p0 \times cin
\end{aligned}
\tag{5}
$$

The concept of block carry generation term and block carry propagation term applies here. For addition of values having n bits, a block carry generation term indicates whether a carry is generated or not within a block when considering such n bits to be constituted by continuous blocks each having an arbitrary number of bits. A block carry propagation term indicates whether a carry input from a lower block causes propagation of carry to the upper block or not. Focusing now on the i–th bit (i<n), suppose that the bits from the i–th bit to the least significant bit constitute a single block. Then, the block carry generation term (Gi) and the block carry propagation term (Pi) can be represented as follows.

$$
\begin{aligned}
Gi &= gi \\
&+ pi \times g(i-1) \\
&+ \ldots \\
&+ pi \times p(i-1) \ldots p2 \times g1 \\
&+ pi \times p(i-1) \ldots p2 \times p1 \times g0 \\
Pi &= pi \times p(i-1) \ldots p1 \times p0
\end{aligned}
\tag{6}
$$

Accordingly, the carry at each bit can be determined by the following expression (7).

$$ci = Gi + Pi \bullet cin \tag{7}$$

Here, an operator ($\bullet$) is defined as follows.

$$(g0, p0) \; (\bullet) \; (g1, p1) = (g0 + (p0 \bullet g1), p0 \bullet p1) \tag{8}$$

This operator ($\bullet$) is of coupling type and, when this is applied to the expression (6), the following expression can be obtained:
if i=1:
(Gi, Pi)=(g1, p1)
if 2<i:

$$
\begin{aligned}
(Gi, Pi) &= (gi \, pi) \; (\times) \; (G(i-1), P(i-1)) \\
&= (gi \, pi) \; (\times) \ldots (\times) \; (g1, p1)
\end{aligned}
\tag{9}
$$

In the BLC addition, logic gates for this operator are disposed in a binary tree representation so that the block carry generation term (Gi) and the block carry propagation term (Pi) for each bit expressed by the expression (6) are determined at a time.

Figure 3:
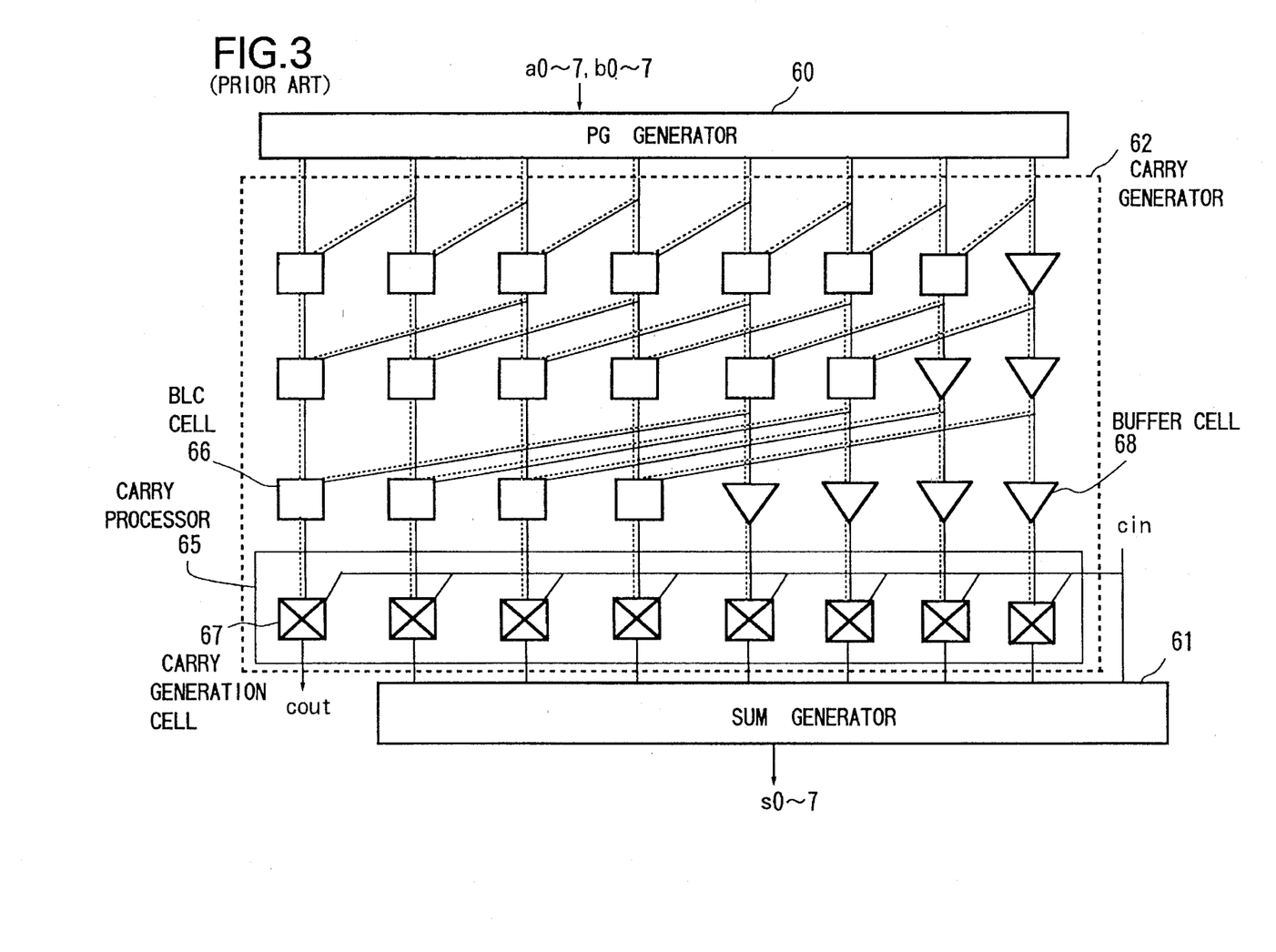
FIG. 3 is a block diagram to show a conventional carry look ahead addition device based on the BLC addition method.

FIG. 3 is a block diagram to illustrate the configuration of an 8-bit carry look ahead addition device based on the conventional BLC addition method. As shown in the figure, a conventional device for BLC addition method comprises a pg generator 60 which executes the expressions (1) and (2) to generate the carry generation term and the carry propagation term, a sum generator 61 which executes the expression (4), and a carry generator 62 which executes the expression (3).

The carry generator 62 further comprises a carry processor 65 consisting of eight carry generating cells 67, BLC cells 66 as logic gates to execute the operator ($\bullet$) and buffer cells 68.

Figure 4:
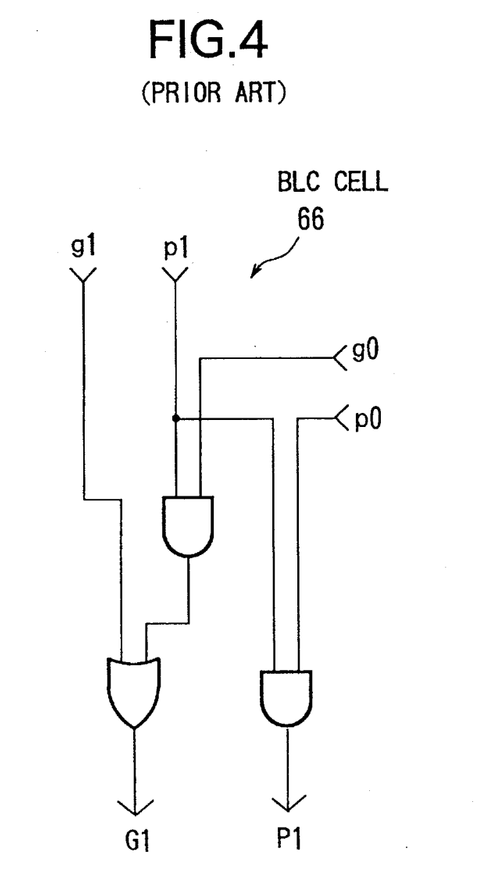
FIG. 4 is a block diagram to show the configuration of a BLC cell.
Figure 5:
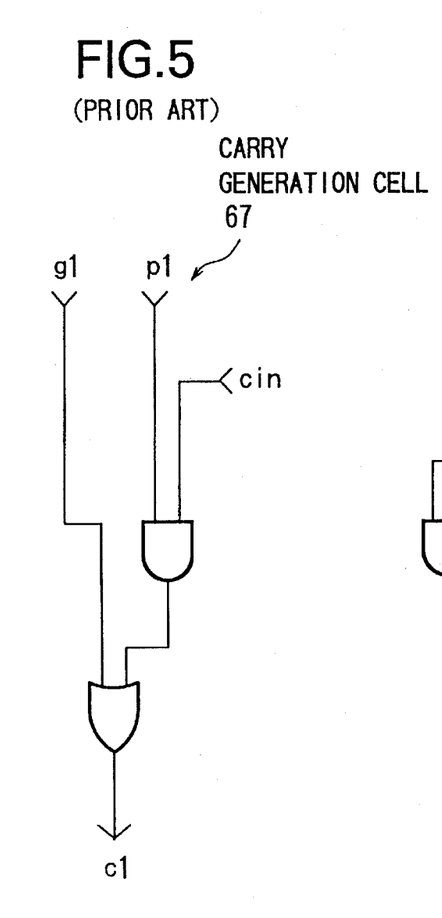
FIG. 5 is a block diagram to show the configuration of a carry generation cell.

The BLC cell 66 has, as shown in FIG. 4, two AND gates and an OR gate. The carry generation cell 67 is to execute the expression (7) and, as shown in FIG. 5, comprises an AND gate and an OR gate. The buffer cell 68 has two buffers.

Now, the flow of processing at the 8-bit carry look ahead addition device based on the BLC addition method is described. Firstly, the pg generator 60 generates the carry generation term gi and the carry propagation term pi for all bits and inputs them to the carry generator 62. The block carry generation term Gi and the block carry propagation term Pi are generated here with considering the bits from the current bit to the least significant bit to be a single block. These block carry generation term Gi and the block carry propagation term Pi are, together with the carry input cin, input to the carry processor 65 and the carry ci is generated. The carry ci is input to the sum generator 61 together with the carry propagation term pi generated by the pg generator 60 so that the sum is determined.

Next, BCLA addition method will be described below following its procedures. Firstly, two input numbers are divided into some blocks each having several bits (For example, a 32 bit number is usually divided into eight 4-bit blocks). For each block, the block carry generation term and the block carry propagation term are determined. Then, the output block carry generation term and the block carry propagation term above are again divided into some blocks each having several bits and then the block carry generation term and the block carry propagation term are determined for each of such blocks. The above processing is repeated until the number of bits in the output block carry generation term and the block carry propagation becomes about 2 to 4 only. Finally, based on the carry input as well as the finally output block carry generation term and the block carry propagation term, the carry for each bit is generated.

Figure 6:
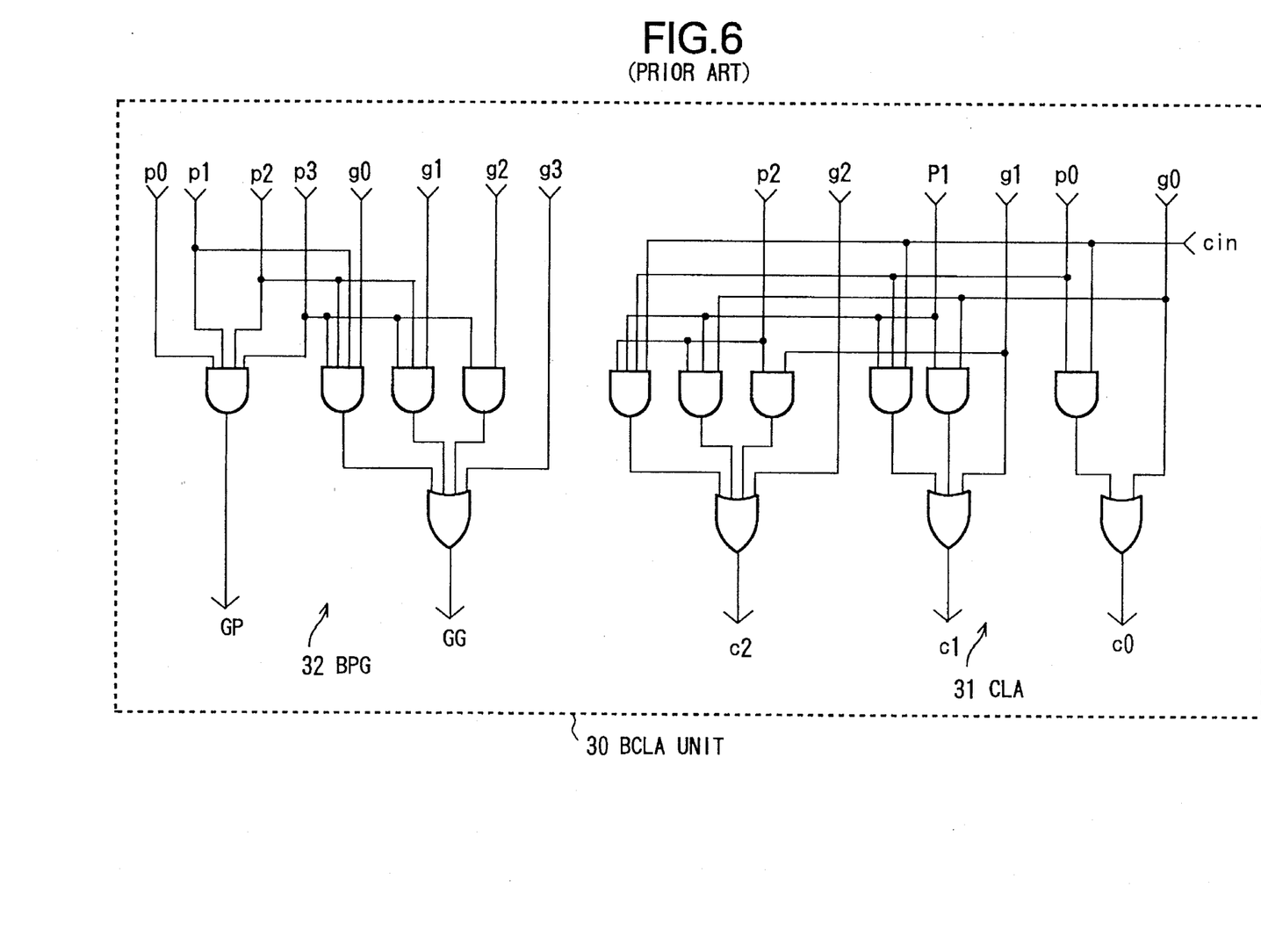
FIG. 6 is a block diagram to show the configuration of a BCLA unit.

FIG. 6 shows a schematic circuit diagram of a conventional BCLA unit for 4-bit blocks which determines the block carry generation term and the block carry propagation term and generates a carry for each bit. In the figure, a BCLA unit 30 comprises a carry look ahead circuit (CLA) 31 for three bits and a block carry generation term (G) and the block carry propagation term (P) generation circuit (BPG) 32. The terms P and G are expressed as follows.

$$P = p3 \cdot p2 \cdot p1 \cdot p0 \quad G = g3 + p3 \cdot g2 + p2 \cdot g1 + p3 \cdot p2 \cdot p1 \cdot p0)$$

In other words, G indicates whether a carry is generated or not in a 4-bit block and P indicates whether or not a carry in a 4-bit block is propagated to the upper block. Such a circuit is usually called a BCLA (Block Carry Look Ahead) unit.

Figure 7:
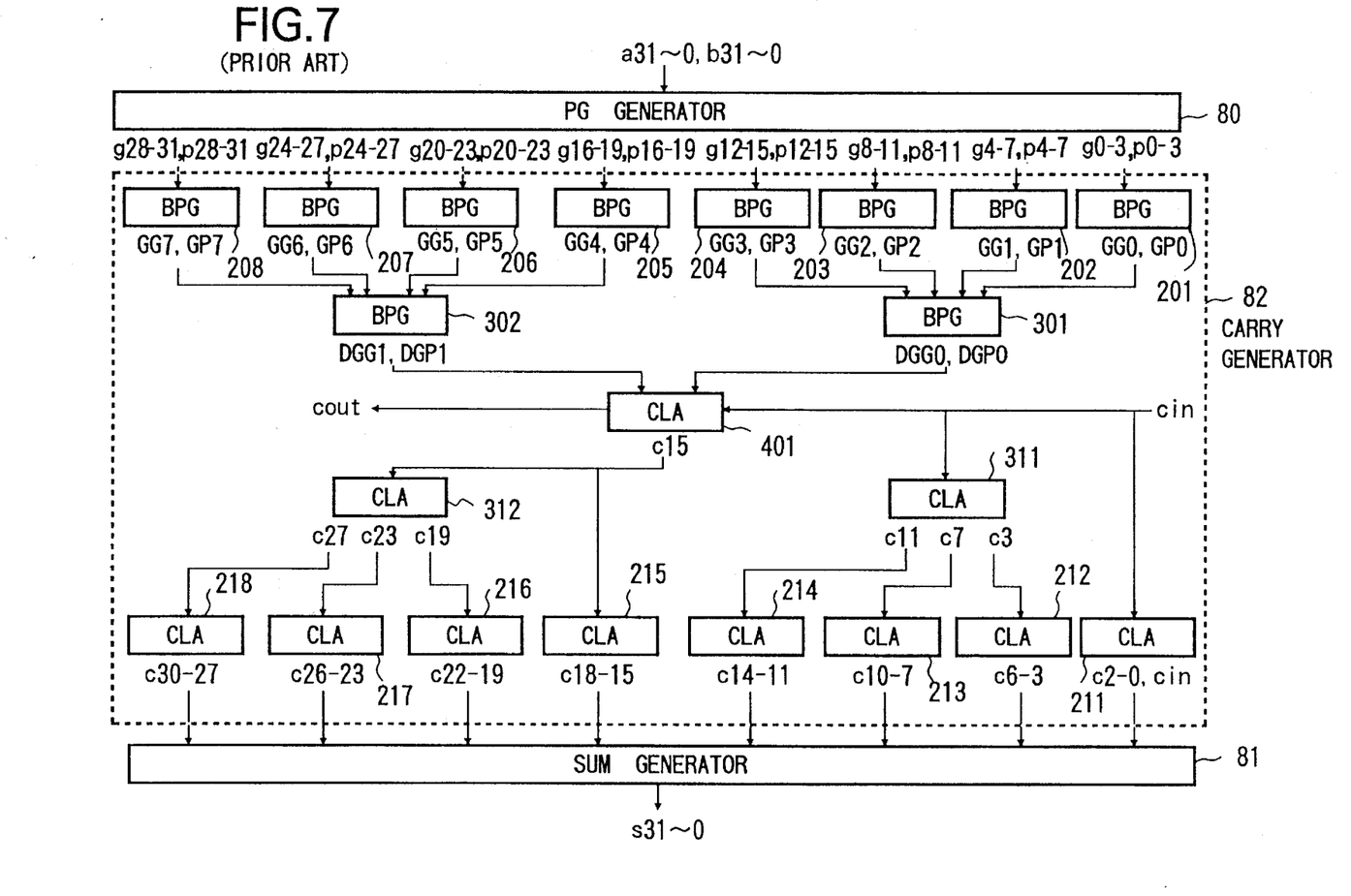
FIG. 7 is a block diagram to show a conventional carry look ahead addition device based on the BCLA addition method.

FIG. 7 is a block diagram to show an example of a 32-bit carry look ahead addition device based on the conventional BCLA addition method using BCLA units as shown in FIG. 6. For convenience of explanation, a BCLA unit in FIG. 6 is divided into a 4-bit BPG unit and a 3-bit CLA unit in FIG. 7.

Figure 8:
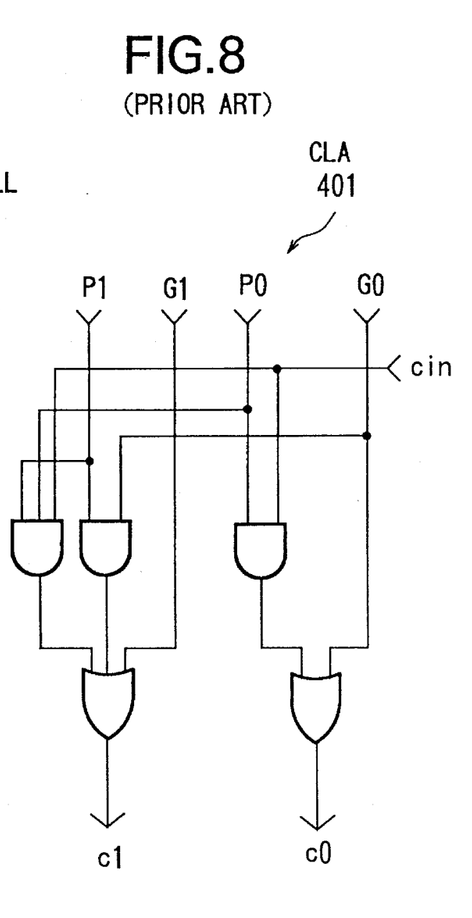
FIG. 8 is a block diagram to show the configuration of a CLA.

As shown in FIG. 7, a conventional carry look ahead addition device using the conventional BCLA addition method comprises a 32-bit carry generation term and carry propagation term generator (pg generator) 80, a carry generator 82 and a sum generator 81. The carry generator 82 comprises 4-bit BPGs 201 to 208, 301 and 302 and 2-bit CLAs 401 and 402 and 3-bit CLAs 211 to 218, 311 and 312. The CLA 401 is provided with three AND gates and two OR gates as shown in FIG. 8.

Now, the flow of processing at the carry look ahead addition device based on the BCLA addition method is described. Firstly, the pg generator 80 generates the carry propagation term pi and the carry generation term gi for all bits and inputs them to the carry generator 82. The input carry generation terms and the carry propagation terms for the bits are divided into eight 4-bit blocks. These blocks are input to eight 4-bit BPGs 201 to 208 so that eight pairs of block carry generation term and block carry propagation term are generated. They are divided again into two 4-bit blocks and sent to the 4-bit BPGs 301 and 302 on the next stage, where two new pairs of block carry generation term and block carry propagation term are generated. These two pairs of block carry generation term and block carry propagation term are sent to the 2-bit CLA 401 on the next stage, where the carry output "cout" and the carry c15 from the 15th bit are generated.

Such carry c15 and the carry input cin are input to the 3-bit CLAs 311 and 312, and the carries c3, c7 and c11 (at the CLA 311) and the carries c19, c23 and c27 (at the CLA 312) are generated. Further, the carries cin, c3, c7, c11, c15, c19, c23 and c27 are input to the 3-bit CLAs 211 to 218 respectively, which causes generation of carries for the remaining bits. Such carries are input to the sum generator 81 together with the carry propagation term pi for each bit generated at the pg generator 80 so that the sum is generated.

In this embodiment, a carry look ahead addition device based on the BCLA addition method comprises eight pairs of 4-bit BCLA units each combining BPG 201 and CLA 211, BPG 202 and CLA 212, ..., BPG 208 and CLA 218, two pairs of 4-bit BCLA units each combining BPG 301 and CLA 311 and BPG 302 and CLA 312, as well as a 2-bit CLA 401. However, it may also comprises eight 4-bit BCLA units and an 8-bit CLA. In either case, the basic concept is the same and this concept can be embodied in various configurations.

When using the above conventional carry look ahead addition methods and devices therefor, either of the methods and devices calculates the block carry generation term and the block carry propagation term so as to generate the carry for each bit from the carry input and the above terms. Supply of the carry input via a route separate from other input data increases the number of stages and logic gates in the carry propagation route, which results in increased delay time and larger power consumption.

SUMMARY OF THE INVENTION

An object of the present invention is to provide a carry look ahead addition method and a device therefor with a simpler configuration of a carry generator which can reduce the delay time and the power consumption.

According to a preferred embodiment to attain the above object, a carry look ahead addition device comprises a carry generation/propagation term generation means which generates the carry generation term and the carry propagation term for each bit upon receipt of two numbers having n (positive integer) bits, a carry means which generates a carry for each bit using the carry generation term and the carry propagation term together with the carry input, and a sum generation means which generates a sum for each bit using the carry propagation term for each bit and the carry for each bit, and a characteristic of the carry generation means is that it receives the carry input as well as the carry generation term and the carry propagation term generated at the carry generation/propagation term generation means so as to generate a carry having a length of n+1 bits by operation without the need for a carry input for the n+1 bit. The carry input is considered the carry generation term at the bit immediately below the least significant bit and the carry propagation term at such bit is 0.

According to a preferred embodiment of a carry look ahead addition device, the carry generation means further comprises a block carry generation means to generate a block carry generation term treating as a single block the range from the current bit to the Bit −1 at the carry generation term and the carry propagation term generated by the carry generation/propagation term generation means and a generation means to generate a carry using the unmodified block carry generation term. The block carry generation means to generate a block carry generation term further comprises logic gates in a binary tree representation to execute the operator (•) defined by (g0, p0) (•) (g1, p1)= (g0+ (p0 • g1), p0 • p1) when the carry generation term and the carry propagation term of n bits generated at the carry generation/propagation term generation means are gi and pi (i<n), and the logic gate for the block including the carry input for the Bit '−1 is replaced with a carry generation cell.

According to another preferred embodiment of a carry look ahead addition device, the carry generation means further comprises a generation means which divides the n-bit carry generation term and the carry propagation term generated by the carry generation/propagation term generation means and the carry generation term at Bit −1 into a plurality of blocks each having several bits to generate a block carry generation term and a block carry propagation term for each of the blocks, and a generation means which generates a carry for each bit using the block carry generation term and a block carry propagation term. The block carry generation/propagation term generation means for the block including the carry generation term of the Bit −1 is replaced with a means to generate the block carry generation term only and the block carry generation terms generated by the block carry generation means is used as a carry.

According to another preferred embodiment to attain the above object, a carry look ahead addition method comprises an input step where the carry input is provided together with the carry generation term and the carry propagation term having a length of n (positive integer) bits, a carry generation step where the carry input is deemed to be the carry generation term at the bit immediately below the least significant bit (Bit −1), a step where the carry propagation term at the Bit −1 is deemed to be 0, and a carry generation step where the carry generation term and the carry propagation term are used for addition for n+1 bits without any carry input for generation of a carry having a length of n+1 bits.

Other objects, characteristics and effects of the present invention will be clarified in the detailed description below.

DESCRIPTION OF THE PREFERRED EMBODIMENTS

Referring to the attached figures, preferred embodiments of the present invention will be described in detail below.

Firstly, the carry look ahead addition method according to the present invention generates a carry as follows: A carry input as well as a carry generation term and carry propagation term having a length of n (positive integer) bits are input. Considering the carry input to be the carry generation term of the bit immediately below the least significant bit (Bit −1), and the carry propagation term of Bit −1 to be 0, values are processed as addition of n+1 bits without any carry input and a carry having a length of n+1 bits is generated.

In other words, in the addition method of the present invention, with n as an arbitrary positive integer, upon input of two numbers having a length of n bits, a carry generation signal and a carry propagation signal for each bit are generated. The carry input is considered to be the carry generation term of the bit immediately below the least significant bit (Bit −1) and the carry propagation term for Bit −1 to be 0. This results in generation of n+1 pairs of carry generation terms and carry propagation terms to be used for operation without the need for a carry input for the n+1 bit. The carry generation term g(−1) and carry propagation term p(−1) at the bit immediately below the least significant bit (Bit −1) are as follows:

$$g(-1) = cin \quad p(-1) = 0 \qquad (11)$$

Conventionally, the block carry generation term and the block carry propagation term from the current bit to the least significant bit are expressed as in the expression (6). With the addition method according to the present invention, however, it can be modified as follows using the expression (11).

$$\begin{aligned}
Pi &= pi \times p(i-1) \ldots p1 \times p0 \times p(-1) \\
&= 0 \\
Gi &= g1 \\
&+ pi \times g(i-1) \\
&+ \ldots \\
&+ pi \times p(i-1) \ldots p2 \times g1 \\
&+ pi \times p(i-1) \ldots p2 \times p1 \times g0 \\
&+ pi \times p(i-1) \ldots p2 \times p1 \times p0 \, g(-1)
\end{aligned} \qquad (12)$$

Therefore, the carry for each bit can be represented as follows based on the expression (7).

$$\begin{aligned}
ci &= Gi + Pi \times cin \\
&= Gi
\end{aligned} \qquad (13)$$

To determine the carry for each bit, it is sufficient to determine the block carry generation term for each bit as above. This reduces the number of logic gates to generate block carry propagation terms for the bits at the carry generator.

Figure 1:
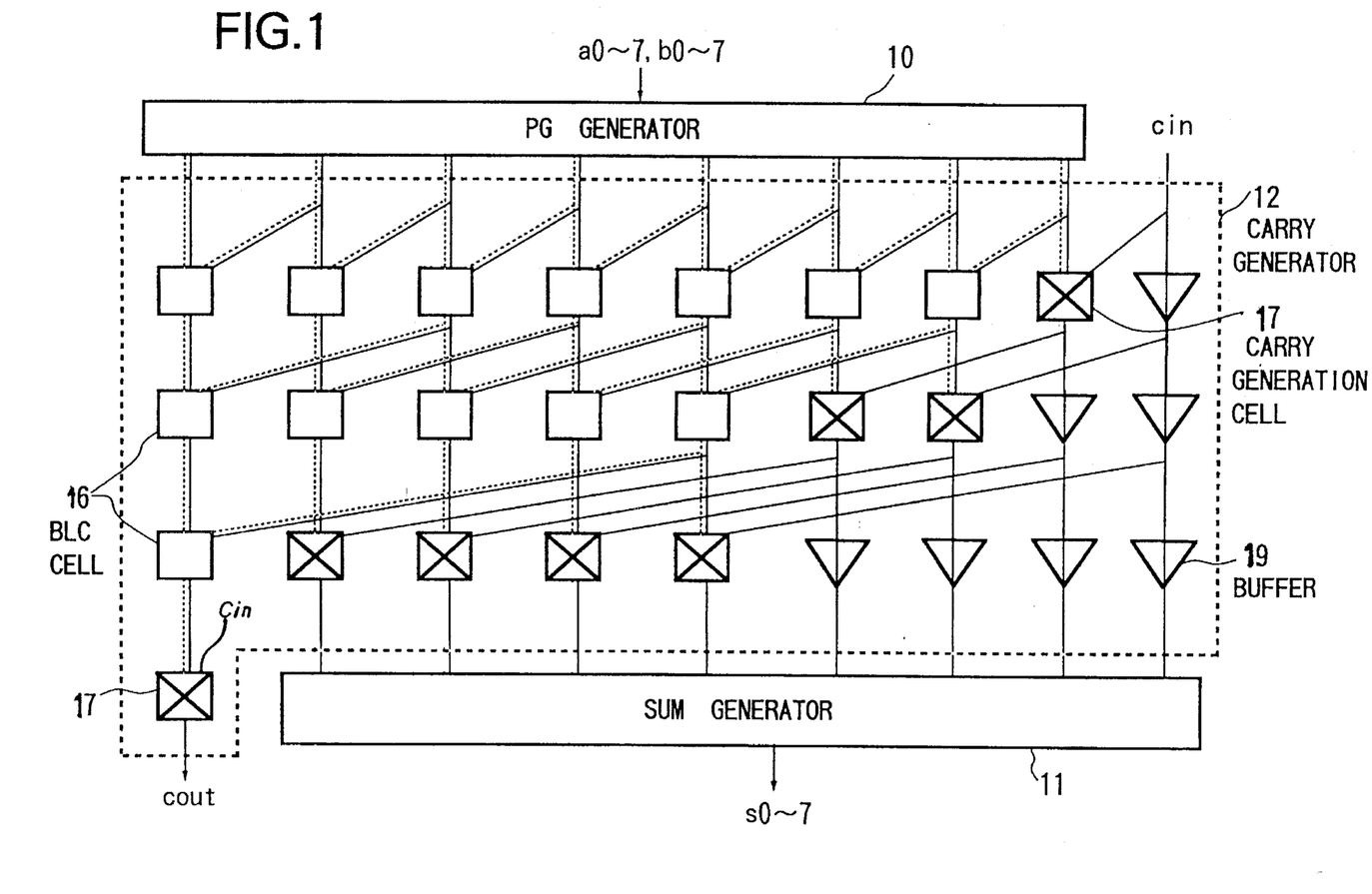
FIG. 1 is a block diagram to show the configuration of a carry look ahead addition device according to a first embodiment of the present invention.

FIG. 1 is a block diagram showing a carry look ahead addition device according to a first embodiment of the present invention where the carry look addition method is used. In this embodiment, the invention is applied to the 8-bit BLC addition method.

As shown in FIG. 1, the carry look ahead addition device where the carry look ahead addition method is applied according to this embodiment comprises a pg generator 10 to execute the expressions (1) and (2), a sum generator 11 to execute the expression (4) and a carry generator 12.

The carry generator 12 according to this embodiment comprises BLC cells 16 as logic gates to execute the operator (•), carry generation cells 17 to execute the expression (7) and buffers 19. The BLC cell 16 is provided with two AND gates and an OR gate as shown in FIG. 3. The carry generation cell 17 has an AND gate and an OR gate as shown in FIG. 4.

Referring now to FIGS. 1 and 3, the operation in the first embodiment of FIG. 1 is described by comparing it to that in the conventional device of FIG. 3. The pg generator 10 generates eight pairs of carry generation terms and carry propagation terms as in FIG. 3. However, the carry generator 12 connected to the output of the pg generator 10 is different. While the carry generator of FIG. 3 has a length of 8 bits, the carry generator 12 in this embodiment has an extension of Bit −1, where the carry input cin is input.

In the carry generator 12, block shifting for two bits is made using the BLC cells 16 in a binary tree representation. However, at the block including the carry input cin, the block carry propagation term is 0 as described above and there is no need of calculation. Therefore, the BLC cell 16 for the block including the carry input cin can be replaced with the carry generation cell 17. Such replacement of the BLC cell 16 with the carry generation cell 17 reduces the number of gates by one AND gate for each cell.

Besides, since the block carry generation term directly constitutes a carry, it is not necessary to provide the carry generator 62 with a carry processor 65 to determine the carry for each bit based on the block carry generation term and the block carry propagation term. This reduces the number of gate stages.

Figure 2:
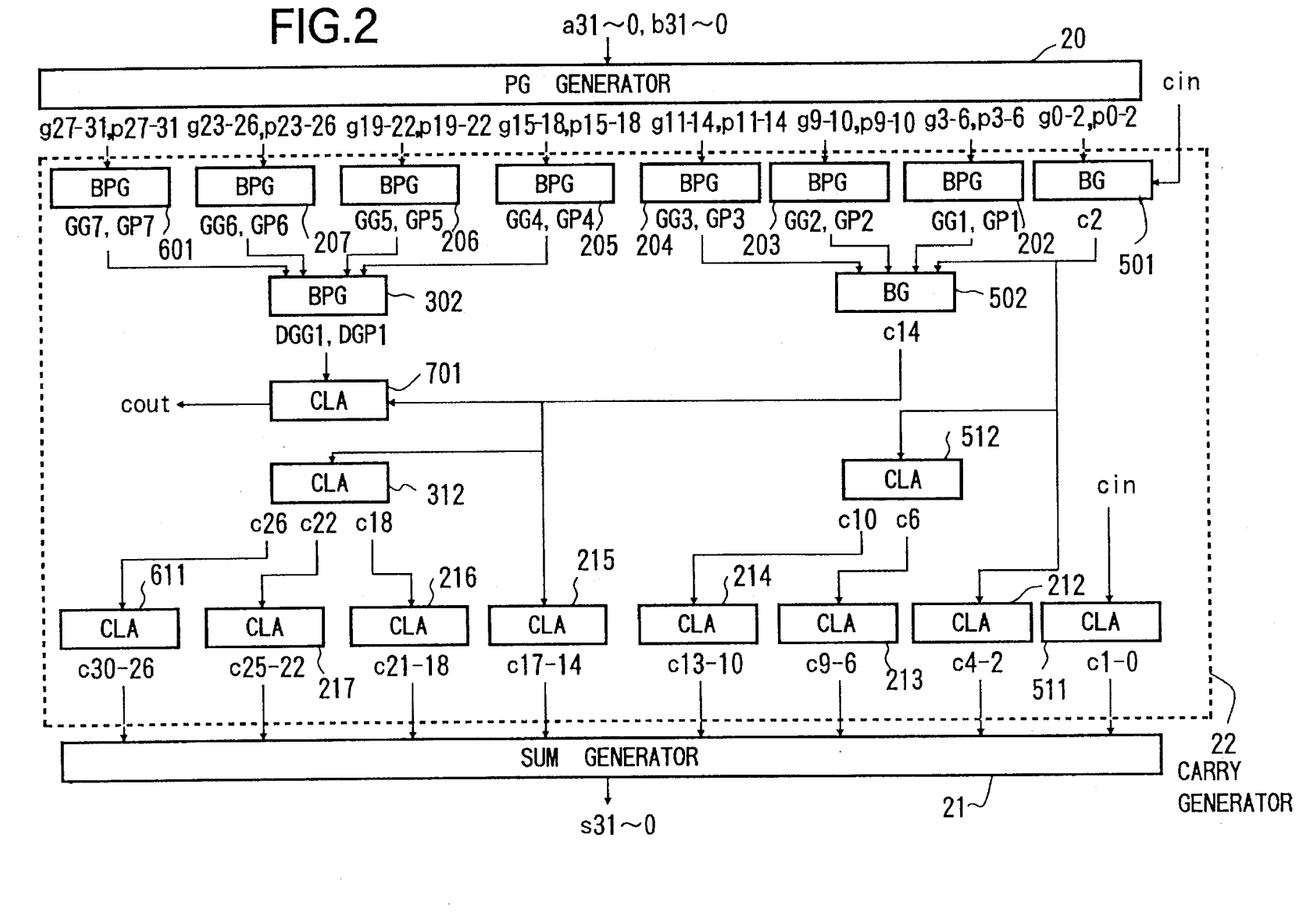
FIG. 2 is a block diagram to show the configuration of a carry look ahead addition device according to a second embodiment of the present invention.

Next, a carry look ahead addition device using the carry look ahead addition method according to a second embodiment of the present invention will be described below. FIG. 2 is a block diagram to show the second embodiment of the carry look ahead addition device where the carry look ahead addition of the present invention is applied. While the first embodiment uses the BLC addition method, the second embodiment in FIG. 2 adopts the BCLA addition method. BLC addition method and the BCLA addition method use different configurations at the carry generator.

As shown in FIG. 2, a carry look-ahead addition device of the present invention comprises, as in the conventional device in FIG. 7, a 32-bit pg generator 20 and a sum generator 21, and further comprises a carry generator 22, instead of the carry generator 12 in FIG. 7.

The carry generator 22 comprises 4-bit block carry generators (BG) 501 and 502, 4-bit BPGs 202 to 207 and 302 and a 5-bit BPG 601, as well as a 1-bit CLA 701, 2-bit CLAs 511 and 572, 3-bit CLAs 212 to 217 and 312 and a 4-bit CLA 611. The BGs 501 and 502 have a configuration with omitting the AND gate for generation of the block carry propagation term in the BPG in FIG. 5. Therefore, when compared with the conventional configuration in FIG. 7, this embodiment has BGs 501 and 502 instead of BPGs 201 and 301 in FIG. 7, and the AND gates for them can be omitted. Also, provision of 1-bit CLA 701 instead of 2-bit CLA 401 reduces the number of logic gates.

Next, the carry look ahead addition device according to the second embodiment in FIG. 2 is compared with the addition device in FIG. 7. First of all, the configuration and the operation of the pg generator 20 and the sum generator 21 are similar to the addition device in FIG. 7. This embodiment, however, has Bit −1, and blocking and carry generation must be given with 33 bits instead of 32 bits. For this purpose, five bits from the most significant bit to the 27th bit are considered as the first block and the bits from Bits 26 to 31 1 are divided into seven blocks each having four bits. These eight blocks in total are input to the block carry generation term and the block carry propagation term generator (BPGs 202 to 207, 601 and BG501) of the carry generator 22 on the next stage.

For the block including Bit −1, the block carry propagation term is known to be "0" as described above and there is no need of calculation. The 4-bit BG generator 501 in place of the BPG 201 in FIG. 7 determines the block carry generation term only. This block carry generation term can be deemed as a carry as it is as described above, the carry c2 from the second bit is generated.

For the other seven blocks, as in the conventional method, the first block uses the 5-bit BPG 601, and the remaining six blocks use the 4-bit BPGs 202 to 207 to determine the block carry generation term and the block carry propagation term. Similarly, for the next stage, the 4-bit clock carry propagation term including the carry c2 is not determined and the BG 502 provided instead of the BPG 301 in FIG. 7 directly provides the carry c14. For the BPG 302 on the next stage, as in FIG. 7, four pairs of block carry generation term and propagation term corresponding to the upper four blocks are input and two pairs of block carry generation term and propagation term are newly generated.

In FIG. 7, the 2-bit CLA 401 is placed next to it for determination of cout and the carry c15 from the lower 16-bit block. In this embodiment, however, the carry c14 from the lower 16 bits has been already determined and the carry output cout only are determined by the CLA 701. The carry c14 is directly input to the CLA 312 and the CLA 215. Thus, in the carry propagation route from the lower 16 bits to the upper 17 bits, the number of gate stages can be reduced by those for the 2-bit CLA 401. The route after this point is substantially the same as in the embodiment in FIG. 7, though there are some differences in bit length in blocking.

As described above, in the carry look-ahead addition method and a device therefor according to the present invention, the carry generator deems the carry input as the carry generation term at the Bit −1 and replaces addition for n bits with that for n+1 bits without a carry input, with considering the block carry propagation term to be 0 and the carry to be the block carry generation term. This simplifies the circuit and results in reduced amount of hardware and reduced number of gates in the carry propagation route. Thus, the operation delay time can be shortened and the power consumption can be reduced.

Obviously, various modifications can be made to the above embodiments. It is intended to cover in the appended claims all such modifications and variations as fall within the true spirit and scope of the present invention.

What is claimed is:

1. A carry look ahead addition device comprising:

carry generation/propagation term generation means for generating a carry generation term and a carry propagation term for each of a plurality of bits upon receipt of two numbers having n (positive integer) bits, carry generation means for generating a carry for each bit using said carry generation term and the carry propagation term together with a carry input, and sum generation means for generating a sum for each bit using the carry propagation term for each bit and said carry for each bit, wherein said carry generation means generating an n+1 carry of said carries having a length of n+1 bits without receiving the carry input by using said carry generation term of the bit immediately below the least significant bit being the n+1th bit as the carry input term and said carry propagation term at such bit being equal to 0.

2. A carry look ahead addition device of claim 1, wherein said carry generation means further comprises:

block carry generation means for generating a block carry generation term, wherein the range from the current bit to said Bit −1 at the carry generation term and the carry propagation term being treated as a single block, and generation means for generating a carry using said block carry generation term.

3. A carry look ahead addition device of claim 2, wherein said block carry generation means further comprises:

logic gates in a binary tree representation for executing art operator (•) defined by (g0, p0) (•) (g1, p1)=(g0+(p0 • g1), p0 • p1) when the carry generation term and the carry propagation term of n bits are gi and pi (i< n), and the logic gate for the block including the carry input for said Bit −1 is replaced with a carry generation cell.

4. A carry look ahead addition device of claim 1, wherein:

said carry generation means further comprises generation means for dividing an n-bit carry generation term, the carry propagation term and said carry generation term at Bit −1 into a plurality of blocks, each block of said plurality of blocks having a plurality of bits to generate a block carry generation term and a block carry propagation term for each of said blocks, and generation means for generating a carry for each bit using said block carry generation term and said block carry propagation term.

5. A carry look ahead addition device of claim 4, wherein said block carry generation/propagation term generation means for the block, including the carry generation term of said Bit −1 is replaced with means for generating only the block carry generation term, wherein the block carry generation terms generated by said block carry generation means are used as a carry.

6. A carry look ahead addition method comprising:

an input step comprising providing a carry input with a carry generation term and a carry propagation term, each of said carry input, said carry generation term and said carry propagation term having a length of n bits wherein n is a positive integer, a carry generation step comprising setting said carry input equal to the carry generation term at the bit immediately below the least significant bit (Bit −1), a zero step comprising setting said carry propagation term at said Bit −1 equal to 0, and a carry generation step comprising using said carry generation term and said carry propagation term for addition for n+1 bits without said carry input for generation of an n+1 carry having a length of n+1 bits.

* * * * *